((12)) United States Patent
Arvidsson et al.

(10) Patent No.: US 7,021,871 B2
(45) Date of Patent: Apr. 4, 2006

(54) INDEXABLE MILLING INSERT

(75) Inventors: Peder Arvidsson, Gävle (SE); Jan Johansson, Sandviken (SE); Lars-Erik Enquist, D'Dorf (DE)

(73) Assignee: Sandvik Intellectual Property Aktiebolag, Sandviken (SE)

( * ) Notice: Subject to any disclaimer, the term of this patent is extended or adjusted under 35 U.S.C. 154(b) by 0 days.

(21) Appl. No.: 10/250,925

(22) PCT Filed: Jan. 3, 2002

(86) PCT No.: PCT/SE02/00006

§ 371 (c)(1),
(2), (4) Date: Dec. 3, 2003

(87) PCT Pub. No.: WO02/055245

PCT Pub. Date: Jul. 18, 2002

(65) Prior Publication Data

US 2004/0071515 A1    Apr. 15, 2004

(30) Foreign Application Priority Data

Jan. 9, 2001 (SE) .................... 0100053

(51) Int. Cl.
*B23C 5/20* (2006.01)

(52) U.S. Cl. ....................... 407/113; 407/42

(58) Field of Classification Search ............... 407/113, 407/114, 40, 42, 48, 34, 61; B23C 5/20, B23C 5/22
See application file for complete search history.

(56) References Cited

U.S. PATENT DOCUMENTS

| 3,798,724 | A | * | 3/1974 | Czopor | 407/93 |
| 4,072,438 | A | * | 2/1978 | Powers | 408/59 |
| 4,764,059 | A | | 8/1988 | Wale | |
| 4,940,369 | A | | 7/1990 | Aebi et al. | |
| 5,028,175 | A | * | 7/1991 | Pawlik | 407/40 |
| 5,207,748 | A | * | 5/1993 | Katbi et al. | 407/114 |
| 5,388,932 | A | * | 2/1995 | DeRoche et al. | 407/113 |
| 5,460,464 | A | * | 10/1995 | Arai et al. | 407/114 |
| 5,593,255 | A | * | 1/1997 | Satran et al. | 407/113 |
| 5,658,101 | A | * | 8/1997 | Hammer | 407/37 |
| 5,800,079 | A | * | 9/1998 | Qvarth | 407/46 |
| 5,803,674 | A | * | 9/1998 | Satran et al. | 407/42 |
| 5,924,826 | A | * | 7/1999 | Bystrom et al. | 407/103 |
| 6,004,080 | A | * | 12/1999 | Qvarth et al. | 407/36 |
| 6,086,290 | A | | 7/2000 | Qvarth et al. | |
| 6,102,630 | A | | 8/2000 | Flolo | |
| 6,220,794 | B1 | * | 4/2001 | Calamia et al. | 407/40 |
| 6,220,795 | B1 | | 4/2001 | Matthews | |
| 6,626,614 | B1 | * | 9/2003 | Nakamura | 408/59 |
| 2003/0077129 | A1 | * | 4/2003 | Cirino | 407/53 |
| 2004/0101371 | A1 | * | 5/2004 | Arvidsson et al. | 407/48 |
| 2004/0253062 | A1 | * | 12/2004 | Schleinkofer et al. | 407/48 |

* cited by examiner

*Primary Examiner*—Boyer D. Ashley
*Assistant Examiner*—Sara Addisu
(74) *Attorney, Agent, or Firm*—Drinker Biddle & Reath LLP

(57) ABSTRACT

The invention relates to an indexable milling insert (3) having a polygonal basic shape, comprising four peripheral sides, which meet each other in pairs in one the one hand two acute corners (15), and on the other hand two obtuse corners (16). Between chip surfaces (17) on the top side of the insert and flank surfaces (18) along the peripheral sides, cutting edges (19) are formed, which individually comprise on the hand a major edge portion (20), and, on the other hand, a rounded minor edge portion (21), formed in connection with an acute corner (15). Characteristic of the invention is the combination that the individual major edge portion (20) is slightly arched and that at least one connecting surface (4) is formed in the bottom side of the insert, of the type that comprises a plurality of parallel ridges spaced-apart by grooves having a cross-section-wise tapering shape and which are intended to co-operate with an analogous connecting surface adjacent to a chip channel in a cutting-insert-carrying milling head.

12 Claims, 6 Drawing Sheets

INDEXABLE MILLING INSERT

TECHNICAL FIELD OF THE INVENTION

This invention relates to an indexable milling insert having a polygonal basic shape and a generally positive cutting geometry, including a top side, a bottom side and four peripheral sides, a first pair of mutually opposite sides which meet a second pair of mutually opposite sides in two acute angled corners as well as two obtuse angled corners, and also two cutting edges for cutting material, formed between chip surfaces on the top side of the insert and flank surfaces along the peripheral sides, which edges individually comprise on the one hand a major edge portion, and, on the other hand, a rounded, minor edge portion, formed in connection with an acute angled corner, which minor edge portion extends in an extension of the major edge portion, wherein the major edge portion is at least partially arched in shape.

GENERAL PRIOR ART

Inserts of the above generally mentioned kind are used in milling tools of the router type, usually in order to create cells or cavities in workpieces, which are delimited by comparatively thin walls. Milling tools of this kind are particularly and frequently used in order to machine aluminium with the purpose of providing light framework components of the type that is used in the construction of aircraft. In these contexts, many different requirements are made of the milling tools ad the inserts thereof, the most important ones of which are a high capacity of chip removing as well as a suitable surface structure of the walls which define the cells.

Previously known inserts for router cutters are formed with plane bottom sides and plane supporting side surfaces, whereby the inserts are mounted in the appurtenant insert seats or seating by the fact that the bottom side of the individual insert is pressed against a plane bottom in the seat at the same time as one or more supporting side surfaces are pressed against supporting side walls in the seat. Inserts of this type may give, in the best case, an acceptable surface smoothness as long as they work at moderate cutting speed by running the cutters at moderate rotational speeds. Within the technical field in question, however, the development is being intensively driven in the direction of ever faster cutting operations. Thus, in the milling of aluminium, machining may already today take place at a cutting or peripheral speed in the order of 10 000 m/min or more, whereby the rotational speed of the milling cutter may exceed 25 000 rpm. Under such conditions, it has proved difficult to attain suitable surfaces on the walls that delimit the miller cells. These difficulties are based on a tendency of the inserts to be dislodged from the positions thereof; something that in turn results in that the active edge, more precisely the major edge portion thereof, cannot retain the intended, theoretical position thereof. In other words, the individual insert will move in an uncontrolled way in relation to the appurtenant milling head. The resulting irregularities in the surface machined by the major edge portion of the insert may be manifested differently. In some cases, plane stripes or ribbon-like part surfaces, which extend at an angle to each other are created (observed in a cross-section, the surface becomes zigzag-shaped or in other regards irregular). In other cases, the irregularities may be shaped as cross-section-wise convexly curved, long narrow part surfaces, spaced pert by thin, inwardly directed flute formations. Said flute formations may give rise to cracks in the wall material.

Aims and Features of the Invention

The present invention aims at obviating the above-mentioned disadvantages and at providing an improved milling insert of the type initially mentioned. Thus, a primary aim of the invention is to provide an insert by means of which the shape of the material surface machined by the major edge portion of the insert may be determined in a controlled and exact way. An additional aim is to provide a milling insert which, in co-operation with the appurtenant milling head, is capable of achieving thin walls and so-called floors in connection with a milled cell or cavity, while maintaining fast milling operations and fine production tolerances. Thus, the insert should be capable of reliably retaining the geometry and exact position thereof even when the milling head is run at high a rotational speed, e.g. 25 000 r/min or more. Yet another aim of the invention is to provide a milling insert capable of entering and leaving the material in the work piece in a dynamically stable and controlled way, and which can be used for so-called ramping. Another aim of the invention is to provide an insert capable of milling material with low energy consumption, i.e. with high efficiency. Furthermore, the insert should be able to efficiently machine material having a comparatively low modulus of elasticity, e.g. such materials as aluminium or the like.

The invention is based on a unique combination of features, each individually previously known within the field of chip removing machining, viz. on the one hand a cutting edge, the major edge portion of which is arched, and, on the other hand, a connecting surface of serration type formed on the bottom side of the insert. Due to the fact that the major edge portion (which executes the major part of the chip removing work) of the cutting edge is arched, the insert itself, as well as the individual insert seat in the milling head, may be given a marked positive geometry. At the same time the connecting surface which is provided with ridges, which is formed on the bottom side of the insert—in co-operation with a corresponding connecting surface on the milling head—ensures a rigid and exact fixing of the insert in the desired position. This means that the two end points between which the arched major edge portion of the cutting edge extend, may be located in, and for a long duration retain, well-defined, radial positions.

Further Elucidation of Prior Art

From U.S. Pat. No. 6,102,630, a milling insert is previously known, which on the bottom side thereof has ridged connecting surface intended to co-operate with a similar connecting surface on a tool. In this case, however, the major edge portion of the insert is straight.

From U.S. Pat. No. 4,940,369 is previously known, an insert of the router-type with a major cutting edge extending lengthways and which is slightly arched. In this case the insert however lacks any form of ridged connecting surface, and as a result the clamping of the cutting insert in the corresponding insert seat will be unstable and unsatisfactory. As a consequence of this it will not be possible to dictate the surface of the machined material in a controlled and exact manner when ensuring fine machining tolerances during high speed milling operations.

DETAILED DESCRIPTION OF A PREFERRED EMBODIMENT OF THE INVENTION

Figures 1, 2:
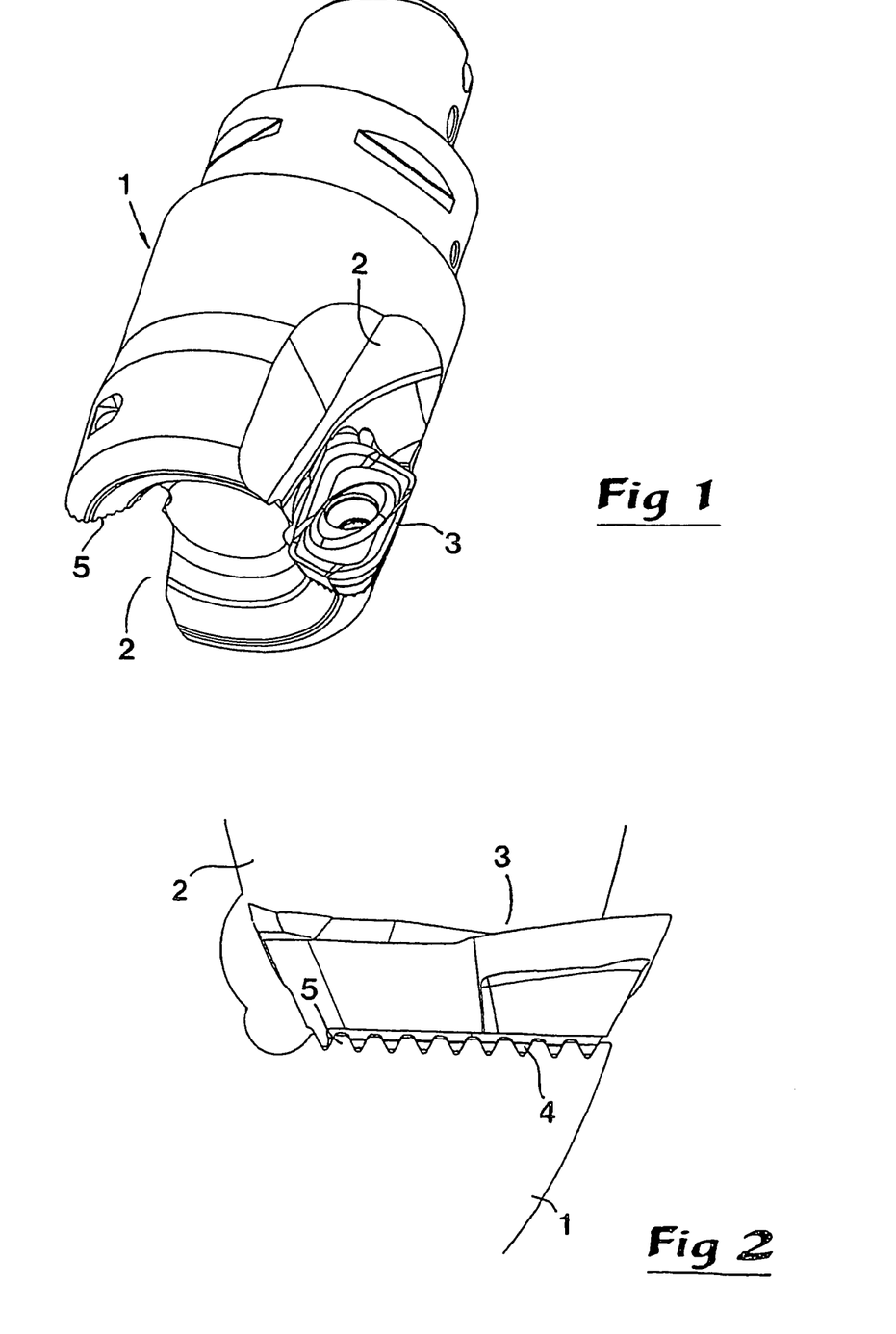
FIG. 1 is a perspective view of a milling tool comprising a milling head and an insert included therein according to the invention.
FIG. 2 is an enlarged, partly cut end view showing the insert from one end of the milling head.

FIG. 1 shows a milling tool in the form of a head 1 having a rotationally symmetrical basic shape, in the envelope surface of which two chip channels 2 are formed. In one of said chip channels, an insert 3 according to the invention is mounted. In FIG. 2 it may be seen how the insert 3 on a bottom side has at least one connecting surface 4 of the type that comprises a plurality of parallel ridges, spaced-apart via grooves and having a cross-section-wise tapering shape. Said connecting surface is intended to co-operate with a similar, ridged connecting surface 5 which forms a insert seat or seating in the chip channel 2.

Figure 3:
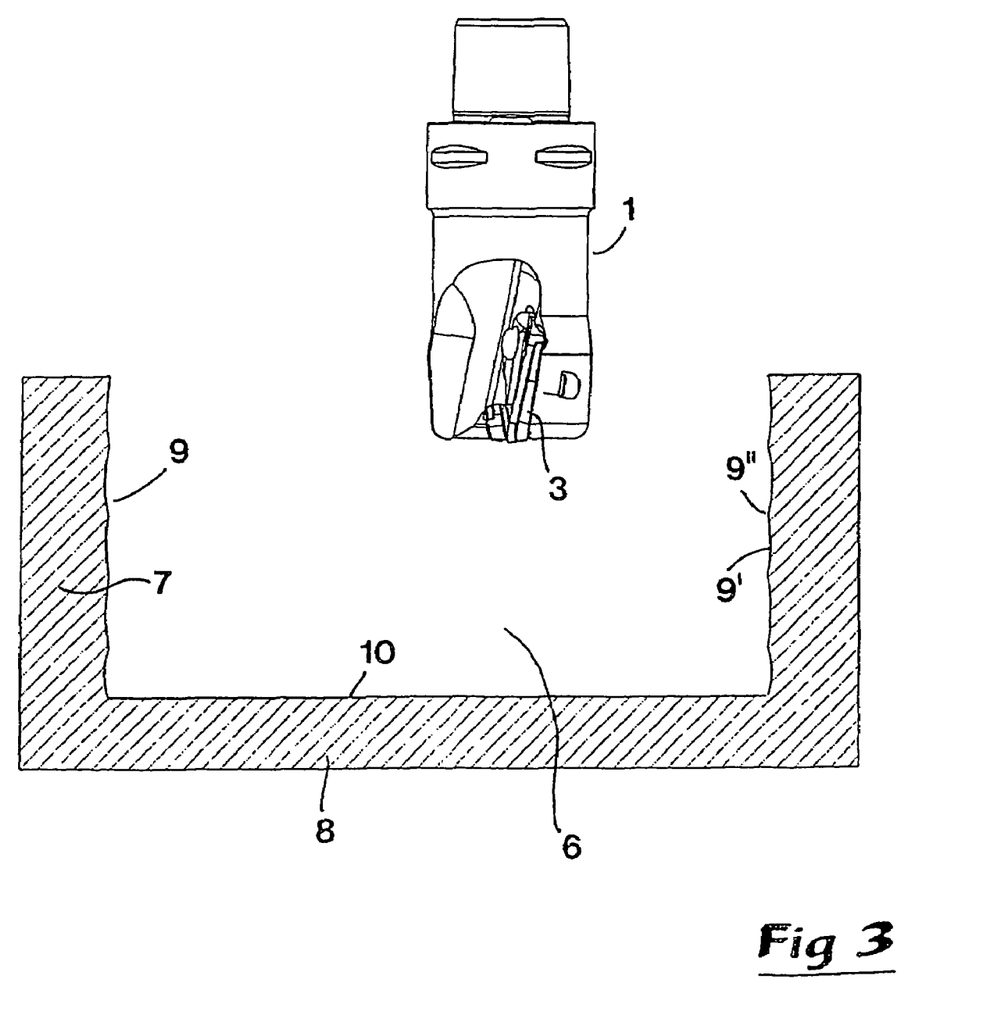
FIG. 3 is a side view of the milling tool shown in connection with a milled cell in a workpiece.

In FIG. 3, the milling tool is shown in connection with a workpiece in which a cavity or cell 6 has been milled, which is delimited by sidewalls 7 and a so-called floor 8. The internal surface of the sidewalls 7 is designated 9, while the upper surface of the floor 8 is designated 10.

It should be pointed out already now, that the geometry of the tool is markedly positive inasmuch as the insert 3 in the mounted state has considerable axial and radial angles. The same are determined by the angles of he insert seat or the connecting surface 5 in relation to the rotation axis of the milling head. In preferred embodiments, the axial angle of the contact surface 5 is within the range of 10–15°, while the radial angle may be within the range of 10–25°.

Reference is now made to FIGS. 4–12, which in detail illustrate the design of the insert according to the invention. The insert has a polygonal basic shape and a topside generally designated 11, a bottom side 12, as well as four peripheral sides 13, 14. Of said peripheral sides, a pair of first, opposite sides 13 meet the second pair of mutually opposite sides 14 in on the one hand two acute corners 15, and, on the other hand, two obtuse corners 16. Cutting edges, generally designated 19, are formed between chip surfaces 17 of the topside of the insert and flank surfaces 18 along the peripheral sides. The same are below denominated primary cutting edges. Each individual primary cutting edge 19 includes a major edge portion 20, as well as a minor edge portion 21, having a markedly round, e.g. partially circular shape, formed in connection with an acute corner 15. The major edge portion 20 extends from a first or front end point 22 to a rear end point 23. The rounded minor edge portion 21 extends in the extension of the major edge portion 20, more precisely from the point 22 to a point 24.

Figure 6:
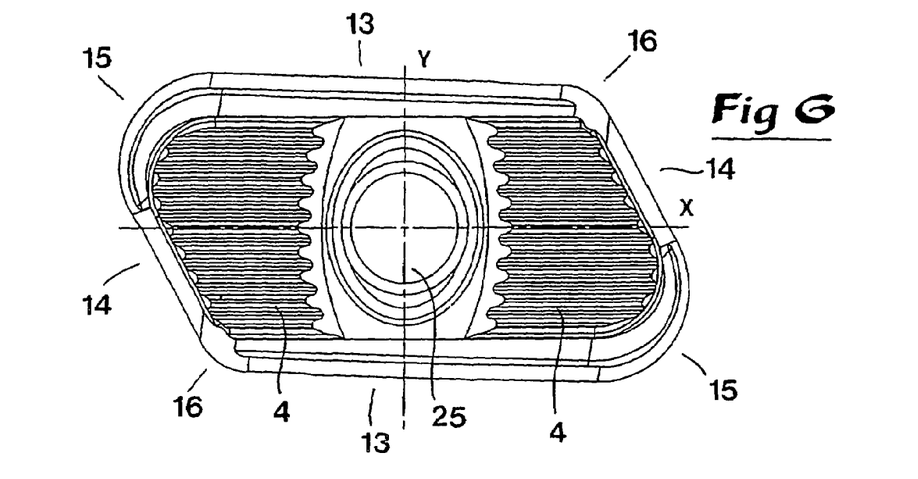
FIG. 6 is a planar view from below of the same insert.
Figure 8:
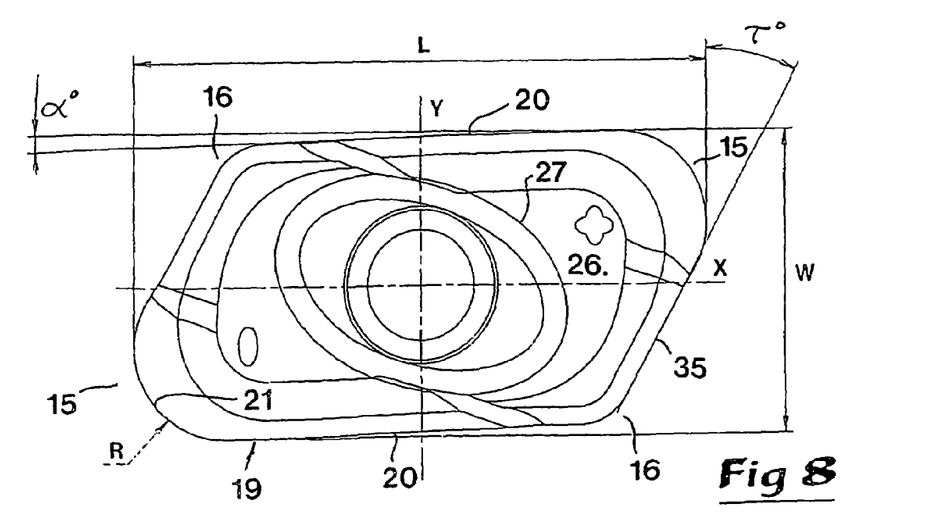
FIG. 8 is a planar view from above of The same insert.

In the shown, preferred embodiment, the insert has a rhomboidal basic shape, whereby the two major edge portions 20 extend along long sides 13 of the insert. In FIGS. 6 and 8, the insert is shown inserted in a conceived co-ordinate system with a first co-ordinate axis or X-axis, and a second co-ordinate axis or Y-axis. The shape of the insert is symmetrical in relation to said two co-ordinate axes.

In FIG. 6 it may be seen that the insert in the preferred embodiment has two connecting surfaces 4, which are placed on both sides of a central, through hole 25 in the insert. Each one of said two connecting surfaces 4 comprises a plurality of ridges, spaced-apart by grooves, which are mutually parallel (the connecting surfaces 4 are described closer below in connection with FIG. 12). Said ridges and grooves are parallel to the X-axis. The two connecting surfaces are spaced-apart from the hole, i.e. end at a distance therefrom.

The individual major edge portion 20 extends generally obliquely in relation to the X-axis so far that the front end point 22 is situated at a greater distance from the X-axis than the rear end point 23. The angle of inclination α (see FIG. 8) between the individual major edge portion 20 and the X-axis should be within the range of 0.5–3°, suitably 0.5–2°. In the example, the angle α amounts to 01.8°.

Figure 10:
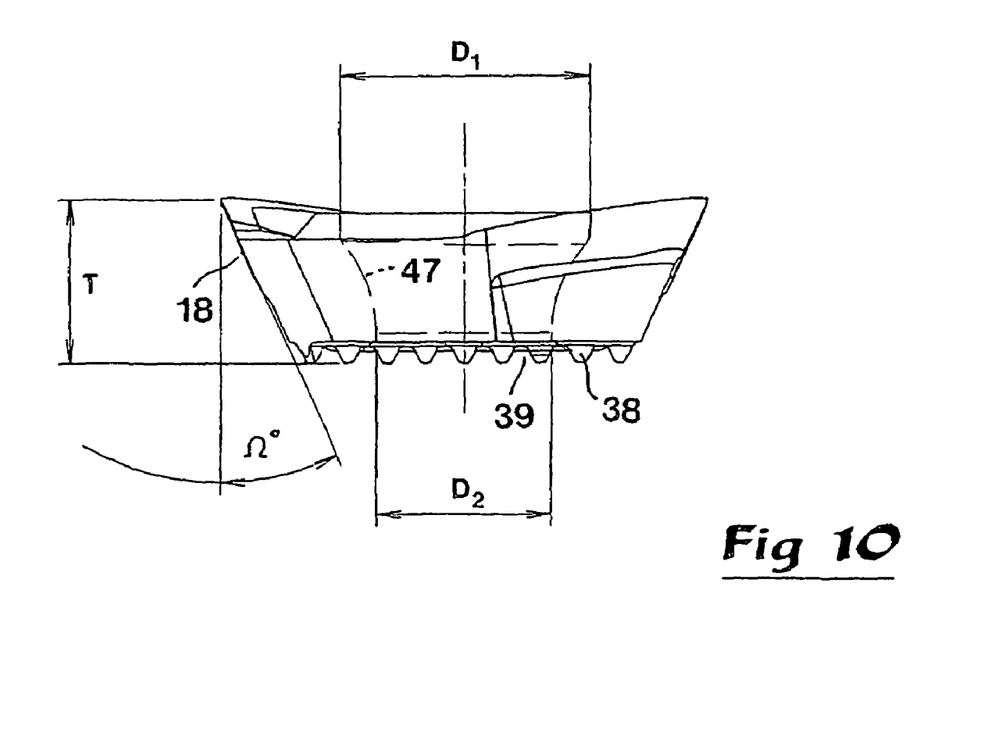
FIG. 10 is an end view of the insert.
Figure 11:
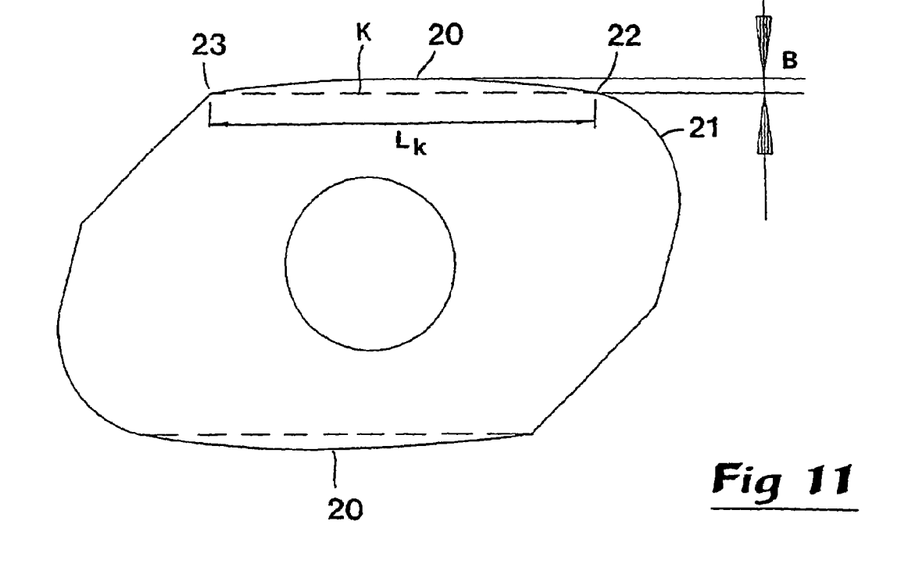
FIG. 11 is a schematic planar view in which t major edge portions comprised in the insert are illustrated with an exaggerated arc-shape.

In accordance with a characteristic feature of the invention, the major edge portion 20 of the cutting edge 19 is convexly arched as viewed perpendicularly to the top side (FIG. 11). This arc-shape is obtained by the fact that the part of the flank surface 18 that is connected to the major edge portion 20 is made with a slightly marked convex curvature. The curvature, however, is so small that the arc-shape of the major edge portion 20 is not visible to the naked eye in FIGS. 4–10. Therefore, the major edge portion is shown schematically with an exaggeratedly large arc-shape in FIG. 11. Ideally, the arc line which forms the major edge portion 20 has an elliptical basic shape, whereby a chord K of the ellipse arc extends between the aforementioned end points 22, 23. According to the invention, the arc height should be within the range of % 0.05–1% of the length $L_k$ of the chord K. In a concrete embodiment example, the chord has a length of 20 mm, whereby the arc height B amounts to 0.02 mm (=0.1% of $L_k$).

Figure 7:
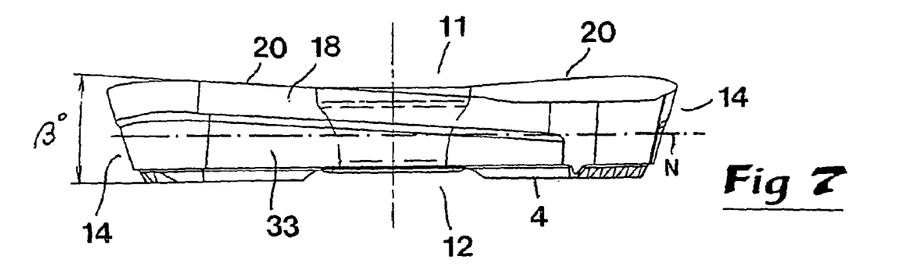
FIG. 7 is a side view of the insert.

In FIG. 7, a neutral plane N is shown with a dash-dotted line, which is parallel to the bottom side of the insert as the same is represented by the peaks or apex surfaces of the ridges which are included in the connecting surfaces 4.

Figure 4:
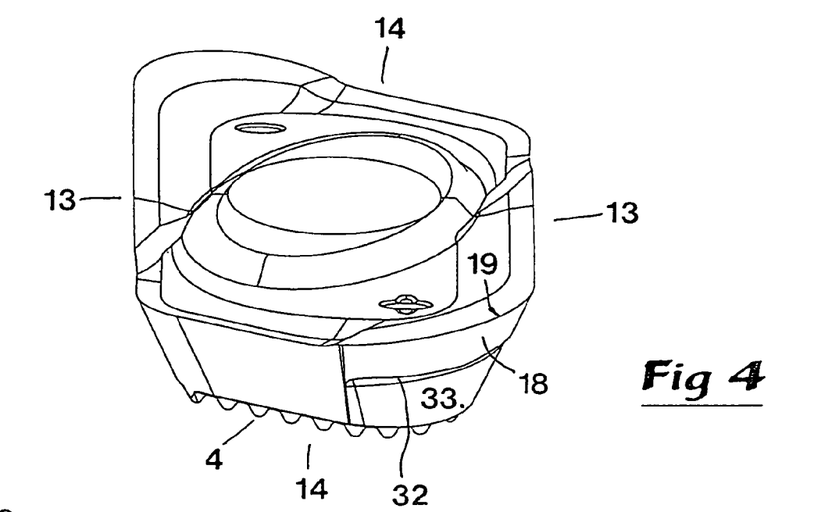
FIG. 4 is a perspective view showing the insert according to the invention as seen obliquely from above and from a short end.
Figure 5:
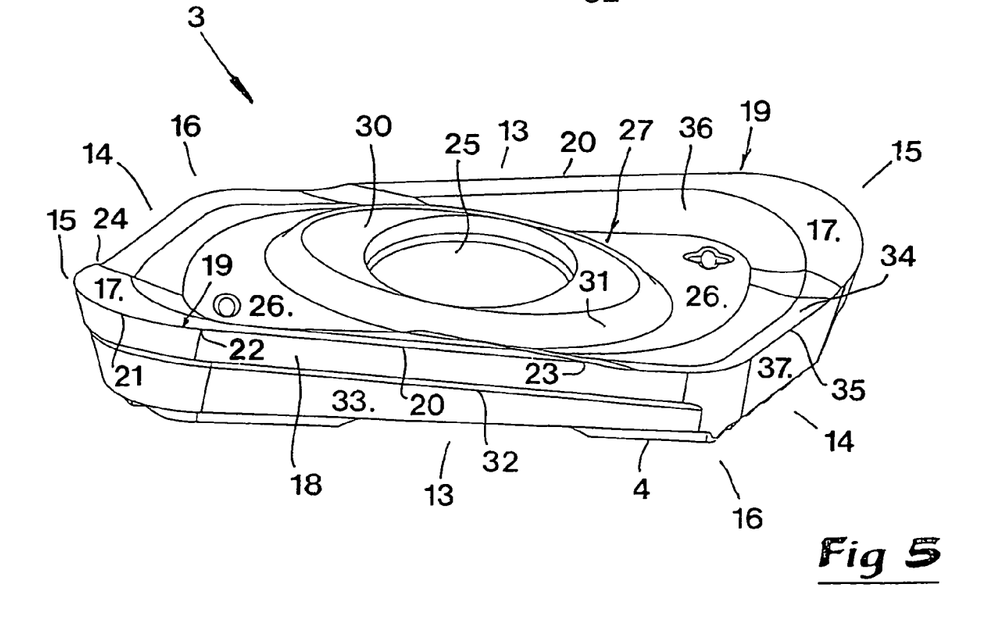
FIG. 5 is a perspective view showing the same insert as seen from a long side.
Figure 9:
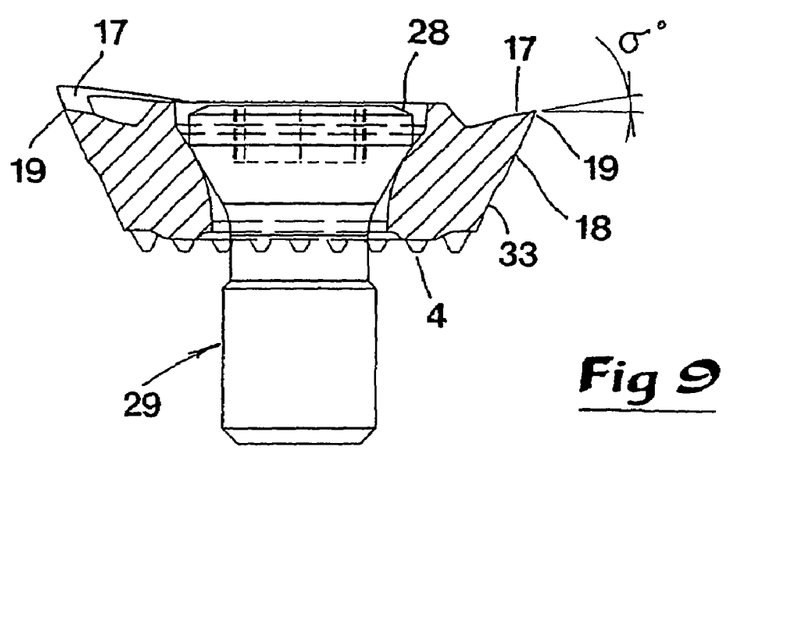
FIG. 9 is a cross-section through the insert shown together with a fixing screw.

Reference is now made to FIGS. 4 and 5, in which it may be seen that the cutting edges 19 together with the chip surfaces 17 are formed on border-like, peripheral material portions in relation to which a valley-like surface 26 is countersunk. Said valley surface is plane and parallel to the neutral plane N. Centrally on the valley surface, an elevated material portion 27 is formed. In the example, where the insert is formed with a central hole 25, the elevated material portion 27 is in the form of an endless collar in which a head 28 of a fixed screw 29 (see FIG. 9) may be housed in a countersunk and protected state. Thus, as is seen in FIG. 9, the topside of the screw head 28 is situated on a lower level that a surrounding plane top surface 30 of the collar 27 when the screw is tightened. From the plane topside 30 of the collar, a side surface 31 extends obliquely downwards/outwards towards the valley surface 26. Said side surface, which is endless, may in practice serve as a chip breaker for the chips that are separated by the individual, active cutting edge 19. In the show embodiment, in which the insert has a rhomboid basic shape, the collar 27 has an elongated, oval shape and extends diagonally, essentially in the direction between the obtuse corners 16 of the insert (see also FIG. 8).

As is further seen in FIGS. 4 and 5, the individual flank surface 18 extends downwards from the cutting edge 19 to a shoulder designated 32, which delimits a narrowed plinth surface 33 under the flank surface itself. Said plinth surface 33 may advantageously be of a larger area than the flank surface 18. In other words, the flank surface is relatively narrow. For this reason, the flank surface may be ground in a simple and efficient way, whereby the narrowed plinth surface provides great freedom to make the flank surface and thereby the cutting edge, with the desired shape. A particular degree of freedom in this respect is accounted for below.

As has previously been pointed out, the insert has a marked axial angle (within the range of 10–15°) in the assembled state. By forming the major edge portion 20 with an elliptic arc-shape with a certain arc height B, the insert may be brought to theoretically generate an entirely plane and smooth internal surface 9 on the walls 7 (see FIG. 3) which delimit a milled cell 6. During practical milling, however, deviations from the theoretic path of motion of the cutting edge, may occur. In order to avoid defects in the machined surface 9, e.g. in the form of convexly curved surface portions together with inwardly opening, crack generating flute formations, the major edge portion 20 may be formed with an arc height that is somewhat larger than the theoretical arc height which generates an entirely plane surface 9. In case the major edge portion 20 in this way is given an exaggerated arc height, the same will generate concavely curved part surfaces 9' between which there are peaks 9'' directed outwards from the wall 7. In FIG. 3, said concavely curved part surfaces 9' are shown on an exaggerated scale. A machined surface having such, very slightly marked concavities is preferable to machined surfaces having convexly curved part surfaces. Particularly within the aircraft industry, where supporting components in aluminium are manufactured by milling cavities or cells in solid workpieces, partially concave surfaces of the type that is shown in FIG. 3 are preferred.

As has previously been mentioned, the two cutting edges 19 form primary cutting edges. Between said primary cutting edges along with the appurtenant chip surfaces 17, the border-like material portion surrounding the valley surface 26 is countersunk. More precisely, two secondary chip surfaces 34 in connection with two secondary cutting edges 35 are countersunk in relation to the chip surfaces 17.

The individual primary cutting edge 19 is advantageously—though not necessarily—sharply ground, more precisely by the chip surface 17 as well as the flank surface 18 being ground. In this context, it should be pointed out that the individual chip surface 17 in its entirety is plane and inclined in two different directions in relation to the neutral plane N. Thus, in a first, substantially axial direction, the chip surface 17 is inclined inasmuch as a front portion of the same adjacent to the minor edge portion 21 is situated at a greater distance from the neutral plane N than a rear portion of the same. Said axial angle of inclination is in FIG. 7 designated β. The angle β may be within the range of 1–10°, suitably 3–5°, and amounts in the example to 4°.

In a second substantially radial direction the chip surface 17 is inclined inasmuch as the distance between the neutral plane and the end (the point 24) which is situated closest the X-axis is smaller than the distance between the neutral plane and other parts of the chip surface. This angle of inclination is designated σ. The angle σ in question may be within the range of 2–15°, suitably 8–12°. In the example it amounts to 10°.

It should be pointed out that the primary chip surfaces 17 as well as the secondary chip surfaces 34 internally transform into a transition surface 34 which extends obliquely downwards/inwards towards the valley surface 26. Said transition surface 36 may advantageously be concavely curved. Irrespective of whether the primary cutting edges 19 are sharp ground or not, the secondary cutting edges 35 may, if desired, remain unground. However, the secondary cutting edges may be single-ground, more precisely by grinding only the flank surface 37. The chip surfaces 34 may advantageously be of a concavely curved shape, which is achieved directly in connection with press moulding.

The clearance angle 106 of the flank surface 18 (see FIG. 10) may advantageously be within the range of 15–30°, suitably 20–25°. In the example, the clearance angle Ω amounts to 25°. Thus, if the angle a amounts to 10°, the acute angle between the surfaces 17, 18 adjacent to the major edge portion 19 becomes 55°. In other words, the insert has a very positive cutting geometry.

Figure 12:
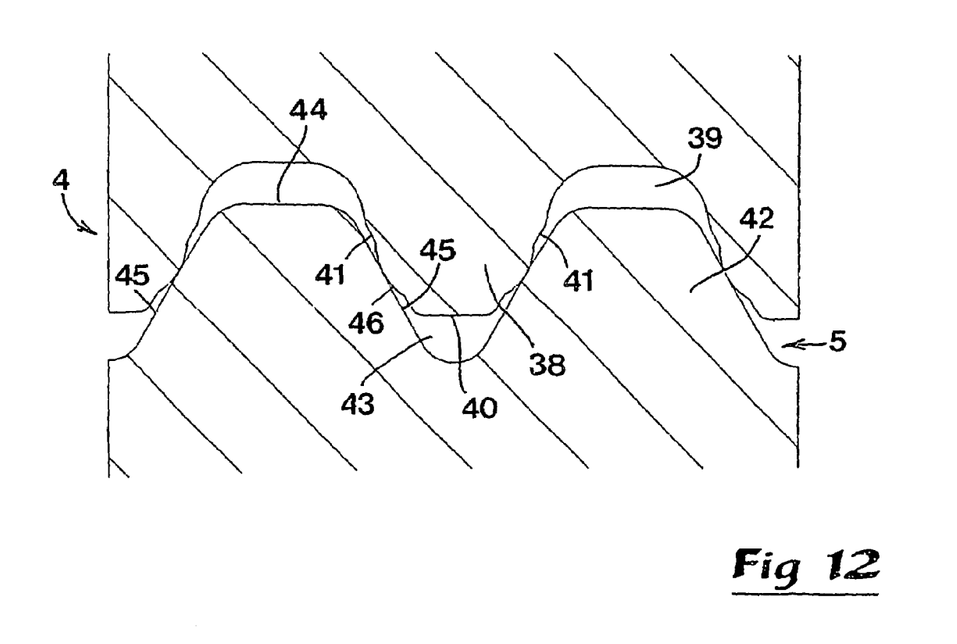
FIG. 12 is a cross-section in a very enlarged scale showing a preferred design of the ridged connecting surface of the insert.

Reference is now made to FIGS. 9, 10 and 12, which closer illustrate the character of the connecting surfaces 4, 5. Each one of the two spaced-apart connecting surfaces 4 which are present on the bottom side of the insert comprises a plurality of long narrow, mutually parallel ridges 38, which are spaced-apart by grooves 39. The individual ridge is of a cross-section-wise tapering shape. More precisely, the individual ridge is delimited by an apex surface 40 (see FIG. 12) as well as two flanks 41, which are inclined at an angle of 60° to each other. In an analogous way, the connecting surface 5 forced in the milling head comprises a plurality of parallel ridges 42, which are spaced-apart by grooves 43 and which are delimited by apex surfaces 44 as well as flanks 45. In this context, it should be pointed out that the material in the insert 3 (which may consist of conventional cemented carbide or the like) usually is considerably harder than the material in the milling head (which may consist of steel, aluminium or the like). Here it should be mentioned that the insert also may be mounted on an intermediate shim having ridged connecting surfaces.

In the preferred embodiment of the connecting surfaces 4 and 5 which is shown in FIG. 12, surface portions 46 having a convexly curved shape are formed on the flanks 41 of the ridges 38, which portions guarantee well-defined contact points between the co-operating flanks of the respective ridges. In practice, said curved surface portions are extremely small. Thus, the arc height may amount to 0.5–5% of the length of a conceived chord between the limiting edges of the surface, whereby the arc height expressed in absolute measurements may vary within the range of 0.0015–0.015 mm.

The preferred embodiment of the connecting surfaces 4, 5 according to FIG. 12 is described in detail in the applicant's simultaneously filed Swedish patent application corresponding to PCT/SE 02/00005 and to concurrently filed U.S. Serial No. (Ser. No. 10/250,923). The content of this parallel patent application is hereby incorporated in the present application by reference.

Below, a specific embodiment follows of the milling insert according to the invention in respect of dimension and angle features. The inset may be of a length L (see FIG. 8) of 30 mn and a width W of 16 mm, whereby the thickness T (see FIG. 10) amounts to 5 mm. The radius R of the individual minor edge portion 21 at each one of the acute corners of the insert is 5 mm. In doing so, the angle of inclination T between the individual secondary cutting edge 35 (which is straight) and the Y-axis amounts to 28°. As mentioned above the angle α amounts to 1.8°, the angle β to 4°, the angle σ to 10°, and the angle Ω to 25°. The central, rotationally symmetrical shaped hole 25 tapers in the direction from the topside of the insert towards the bottom side. The largest diameter $D_1$ of the hole amounts to 8 mm, while the smallest diameter $D_2$ amounts to 5.7 mm. On tightening, a conical surface of the screw head 28 is pressed against a convexly curved abutment surface 47 in the hole.

The Advantages of the Milling Insert According to the Invention

A substantial advantage of the insert according to the invention, is that the major edge portion of the active cutting edge thanks to the arc-shape thereof generates the desired surface (entirely plane or having concave part surfaces according to FIG. 3) at the same time as the connecting surface or surfaces formed by ridges, in cooperation with a corresponding connecting surface of the milling head ensure an exact, well-defined location of the major edge portion in relation to the center line or rotation axis of the milling head. Thanks to the inelastic fixing of the insert which is attained via the connecting surfaces 4, 5, the radial distances between the two opposite end points 22, 23 of the major edge portion may not only be initially fixed very exactly, but also be maintained constant during operation. Another substantial advantage is that the markedly positive geometry, which is attained not only by the own cutting geometry of the insert but also by the positive tool geometry (i.e. by the fact that the insert seat is angled axially as well as radially), implies that the chip-removing capacity of the insert and the milling tool becomes very high, at the same time as the desired structure of the machined surface is obtained directly in connection with the milling. In other words, no aftertreatment of the milled surface is required. In this context, it should be pointed out that the rounded minor edge portion of the active cutting edge in a conventional way generates a plane surface 10 on the floor in the milled cell. Another substantial advantage is that the insert may be provided easily with extremely sharp cutting edges, more precisely by simple grinding the chip and clearance surfaces attached to the respective cutting edges. Hereby, the narrowed plinth surfaces under the flank surfaces guarantee that the grinding operation may be carried out fast, easily and with minimal energy consumption. It may also be mentioned that the co-operating connecting surfaces engaging in each other by edge action secure the insert in the insert seat of the milling head in a very reliable way. In other words, the insert will remain in place even if it is exerted to such centrifugal forces that may arise when the milling head is driven at an extremely high rotational speed, e.g. 10 000 r/min or more.

Feasible Modifications of the Invention

The invention is not solely limited to the embodiment described above and shown in the drawings. Thus, it is, for instance, feasible to grind or in another way form strengthening chamfering surfaces, in connection with the two cutting edges. Furthermore, it is feasible to polish the chip surfaces adjacent to the cutting edges. The invention is also applicable to other inserts than those that are provided with holes for fixing screws. For instance, the insert may be fixed by means of clamps. In such cases, a heightened material portion on the valley surface of the insert may be formed with a countersink or a seat, the shape of which has been adapted to the shape of the clamp nose. Although ridges having concavely curved flank surface are preferred in the connecting surface or surfaces of the insert, it is also feasible to form the ridges with plane flanks of a conventional type. Furthermore, the insert may be of a rhombic shape instead of rhomboid. Although the insert according to the invention above has been described above all for machining of such soft materials as aluminium, the same may, along with the appurtenant milling cutter, also be used for machining of other, suitably metallic materials, such as steel, titan and the like.

The invention claimed is:

1. Indexable milling insert having a generally polygonal shape and a generally positive cutting geometry, comprising a top side, a bottom side, and a peripheral side structure; the peripheral side structure including a first pair of mutually opposite peripheral sides and a second pair of mutually opposite peripheral sides intersecting the first pair to define two acute-angled corners and two obtuse-angled corners of the insert; two cutting edges each formed at a junction between the top side and a respective peripheral side; each cutting edge including a major portion extending along a respective peripheral side, and a minor portion joined to the major portion and extending along a respective acute-angled corner; at least part of the each major portion being convexly arc-shaped as viewed in a direction perpendicular to the top side; the bottom side defining a connecting surface adapted to connect the insert to a support; the connecting surface including a plurality of parallel ridges alternating with parallel grooves, the grooves having a cross-sectional shape widening in a direction away from the top side; the top side defining a chip face; each of the cutting edges extending along a border portion of the chip face which transforms into a valley portion of the chip face; the valley portion extending to a raised portion of the chip face disposed substantially centrally in the top side.

2. Milling insert according to claim 1 wherein a throughhole extends through the insert from the top side to the bottom side, the raised portion comprising a collar extending around the through-hole and forming a countersink therefor.

3. Milling insert according to claim 2 wherein the collar has an oval shape and extends generally diagonally in a direction between the obtuse angled corners.

4. Milling insert according to claim 2 wherein the connecting surface comprises two connection surfaces separated by the hole.

5. Milling insert according to claim 1 wherein the main portion of each cutting edge forms an oblique angle relative to the groove direction as viewed in a direction perpendicular to the top surface.

6. Milling insert according to claim 5 wherein the oblique angle is in the range of 0.5–3°.

7. Milling insert according to claim 5 wherein the oblique angle is in the range 1.5–2°.

8. Milling insert according to claim 1 having a generally rhomboidal shape including two long sides and two short sides, wherein the arc-shaped parts of the cutting edges extend along respective long sides.

9. Milling insert according to claim 1 wherein each of at least two of the peripheral sides includes a flank surface extending from a respective major cutting edge portion to a shoulder facing generally toward the bottom side, the shoulder spaced from the bottom side by a plinth surface of the peripheral side.

10. Milling insert according to claim 1 wherein a surface area defined by the blank surface is greater than a surface area defined by the plinth surface of the same peripheral side.

11. Indexable milling insert having a generally polygonal shape and a generally positive cutting geometry, comprising a top side, a bottom side, and a peripheral side structure; the peripheral side structure including a first pair of mutually opposite peripheral sides and a second pair of mutually opposite peripheral sides intersecting the first pair to define two acute-angled corners and two obtuse-angled corners of the insert; two cutting edges each formed at a junction between the top side and a respective peripheral side; each cutting edge including a major portion extending along a respective peripheral side, and a minor portion joined to the major portion and extending along a respective acute-angled corner; at least part of the each major portion being convexly arc-shaped as viewed in a direction perpendicular to the top side; the bottom side defining a connecting surface adapted to connect the insert to a support; the connecting surface including a plurality of parallel ridges alternating with parallel grooves, the grooves having a cross-sectional shape widening in a direction away from the top side; the top side defining a chip face; each of the cutting edges extending along a border portion of the chip face which transforms into a valley portion of the chip face; the valley portion extending to a raised portion of the chip face disposed substantially centrally in the top side, wherein the arc-shaped part of the major portion of each cutting edge defines an arc height in the range of 0.05–1.0% of an imaginary chord extending between opposite ends of the arc-shaped part.

12. Indexable milling insert having a generally polygonal shape and a generally positive cutting geometry, comprising a top side, a bottom side, and a peripheral side structure; the peripheral side structure including a first pair of mutually opposite peripheral sides and a second pair of mutually opposite peripheral sides intersecting the first pair to define two acute-angled corners and two obtuse-angled corners of the insert; two cutting edges each formed at a junction between the top side and a respective peripheral side; each cutting edge including a major portion extending along a respective peripheral side, and a minor portion joined to the major portion and extending along a respective acute-angled corner; at least part of the each major portion being convexly arc-shaped as viewed in a direction perpendicular to the top side; the bottom side defining a connecting surface adapted to connect the insert to a support; the connecting surface including a plurality of parallel ridges alternating with parallel grooves, the grooves having a cross-sectional shape widening in a direction away from the top side; the top side defining a chip face; each of the cutting edges extending along a border portion of the chip face which transforms into a valley portion of the chip face; the valley portion extending to a raised portion of the chip face disposed substantially centrally in the top side, wherein the arc-shaped part of the main portion of each cutting edge defines an arc height large enough wherein respective major portions cut a concavely curved surface in a workpiece.

* * * * *